United States Patent [19]

Moritani et al.

[11] Patent Number: 4,929,482

[45] Date of Patent: May 29, 1990

[54] HEAT RESISTANT CONTAINER

[75] Inventors: Tohei Moritani; Hidemasa Oda; Toshiaki Sato; Taichi Negi; Keiji Matsumura; Syuji Kawai, all of Kurashiki; Nobuo Tanaka, Nishinomiya; Satoshi Hirofuji, Kurashiki, all of Japan

[73] Assignee: Kuraray Co., Ltd., Kurashiki, Japan

[21] Appl. No.: 219,113

[22] Filed: Jul. 14, 1988

[30] Foreign Application Priority Data

Jul. 23, 1987 [JP] Japan .................. 62-184959

[51] Int. Cl.$^5$ ............................. B65D 81/26
[52] U.S. Cl. .................. 428/36.4; 428/36.6; 428/36.7; 428/483; 428/522; 428/688; 206/204
[58] Field of Search .............. 428/36.4, 36.6, 36.7, 428/482, 483, 522, 688, 689; 206/204, 524.5

[56] References Cited

U.S. PATENT DOCUMENTS

| | | | |
|---|---|---|---|
| 4,081,422 | 3/1978 | Cordes et al. | 525/444 |
| 4,407,897 | 10/1983 | Farrell et al. | 428/516 |
| 4,425,410 | 1/1984 | Farrell et al. | 428/516 |
| 4,554,190 | 11/1985 | McHenry et al. | 428/35 |
| 4,741,936 | 5/1988 | Nohara et al. | 428/483 |

*Primary Examiner*—James Seidleck
*Attorney, Agent, or Firm*—Kramer, Brufsky & Cifelli

[57] ABSTRACT

The present invention provides a heat-resistant container comprising an ethylene-vinyl alcohol copolymer layer and a crystalline polyester layer. In particular, when an ethylene-vinyl alcohol copolymer containing a drying agent is used, the obtained container is both ovenable and retortable, thereby being highly useful.

13 Claims, No Drawings

HEAT RESISTANT CONTAINER

BACKGROUND ART

1. Field of the Invention

This invention relates to a heat-resistant plastic container which can undergo retort treatment and has a high gas barrier property, thereby protecting food contained therein from putrefaction or oxidation even during storage at a room temperature and being excellent in capability for a long-term storage, and which at the same time can undergo heating in a microwave or in an electric cooking oven while containing food without transferring the content into a different container.

2. Background of the Invention

Recently, as the home use of electric cooking ovens as well as microwaves are being wide-spread, requirements for plastic containers to be usable in the both ovens ("dual-ovenable") have been enhanced. As resins usable in electric cooking oven (220° C.), crystalline polyester (hereinafter referred to as PET), polyetherimide, and the like are known; and in particular, containers utilizing crystalline PET have been put to practical use. However, conventional PET containers cannot, since they are lacking both in retortability (capability for retort treatment) and in gas barrier property, be used for containers for transporting and storing foods at a room temperature, and their uses therefore have been limited.

Multi-layer containers made of polypropylene and a gas-barrier resin have been used for containers being capable of retort treatment and having gas barrier properties. As such gas-barrier resins, ethylene-vinyl alcohol copolymer (hereinafter referred to as EVOH) or polyvinylidene chloride resins have been used. However, multi-layer containers utilizing polypropylene have, though usable in microwaves, no heat resistance against electric cooking ovens.

U.S. Pat. No. 4,425,410 discloses a retortable multilayer structure comprising an EVOH layer containing a drying agent and a polyolefin layer provided thereon, but does not state about providing a crystalline PET layer on an EVOH layer containing a drying agent.

Unexamined Japanese Patent Laid-Open No. 62660/1984 discloses an ovenable container comprising a crystalline PET, but does not state about a container comprising a crystalline PET layer and an EVOH layer or an EVOH layer containing a drying agent provided thereon.

SUMMARY OF THE INVENTION

Then, it is thought to improve food storing capability of the heat-resistant container utilizing crystalline (crystallized) PET by combining with the PET an EVOH to get a multi-layer container. In fact, a multi-layer container obtained by co-extruding a crystalline PET, an EVOH and an adhesive resin into a sheet, followed by deep blowing, has a high degree of gas barrier property, and is excellent in performances of protecting food from oxidation. However, it has been noted that the obtained container shows, when subjected to a retort treatment with hot water at a temperature of 120° C., a decrease in its gas barrier property due to water absorption by the EVOH layer. A test was made to use a polyvinylidene chloride instead of EVOH, but the molding was not successful due to a poor thermal stability. A heat-resistant container provided with both capability for retort treatment and a gas barrier propertiy has thus not been known.

The present inventors have wrestled how to get a heat-resistant container having both retortability and a storage capability as represented by gas barrier property and come to the present invention.

The present invention provides a heat-resistant container comprising an EVOH layer containing a drying agent and a crystalline polyester resin layer provided on at least one surface of the EVOH layer, characterized by an excellent storing capability incorporating retortability, as well as an excellent dimensional stability when heated in an electric cooking oven or in a microwave.

The multi-layer container of the present invention is excellent in gas barrier property and in retortability, and further in heat resistance, thereby enabling a long-term storage of food, as well as enabling boiling or heating in a microwave and in an electric oven (220° C.) without transferring the contents beforehand to a different container. The container is useful also in the field where maintaining odor is required.

DETAILED DESCRIPTION OF THE INVENTION

The present invention is now explained in more details hereinbelow.

The crystalline PET as used in the present invention is a composition comprising a thermoplastic polyester containing as a principal component at least 80 mol %, preferably at least 90 mol % of ethylene terephthalate unit, and a crystallization accelerator incorporated therein. The PET resin may contain a dicarboxylic acid(s) other than terephtahlic acid or a glycol component(s) other than ethylene glycol. Relative to the molecular weight of the polyester, the inherent viscosity is prelerably at least 0.60 dl/g, more preferably at least 0.70 dl/g, since the molecular weight greatly influences sheet moldability and the properties of the obtained container. The inherent viscosity as used herein means a viscosity value measured in a mixed solvent of phenol tetrachloroethane (1:1 by weight) at 30° C. The crystallization accelerator is selected from a variety of compounds, among which are inorganic compounds having minute particle diameters (less than 2 to 3$\mu$). Examples of such inorganic compounds are talc, silica, calcium carbonate, titanium dioxide and magnesium oxide, and they are used generally in an amount not more than 1% by weight based on the weight of the afore-mentioned polyester. Another group contains polyolefins, particularly polymers obtained from olefin monomers having 2 to 6 carbon atoms such as low density polyethylene, high density polyethylenes, linear low density polyethylene, polypropylene, polyisopropylene, polybutene and poly-4-methylpentene. They are used in an amount from 1 to 15% by weight, preferably from 2 to 8% by weight. Further there are sodium salts or potassium salts of organic acids having from 7 to 30 carbon atoms, and sodium salts or potassium salts of organic polymers having carboxyl groups, such as sodium stearate, sodium benzoate, sodium salt of ethylene-methacrylic acid copolymers and sodium salt (fully or partially neutralized) of styrene-maleic anhydride copolymer. They are incorporated into the afore-mentioned polyester generally in an amount of from 0.01 to 5% by weight for organic acid salts and in an amount of from 0.1 to 10% by weight for salts of organic polymers. Among the above, particularly preferred as crystallization accelerator are polyolefins.

Addition of 0.05 to 5% by weight of a heat stabilizer to the PET is effective since the finished products are exposed to high temperatures for a long time. One or more heat stabilizers shown below are often used. Examples of the heat stabilizers include alkylated substituted phenols, bisphenols, substituted bisphenols, thiobisphenols, polyphenols, thiobisacrylates, aromatic amines, organic phosphites and polyphosphites. Examples of the aromatic amines are primary polyamines, diarylamines, bisdiarylamines, alkylated diarylamines, ketone-diarylamine condensation products, aldehyde-amine condensation products, aldehyde-amine and the like. Particularly preferred heat stabilizers are polyphenols having at least two phenol ring structures therein, such as tetrakis methane. and 1,3,5-trimethyl-2,4,6-tris(3,5-di-t-butyl-4-hydroxybenzyl) benzene, of the two the former being more preferred. Further in mixing the above compounds, other additives including a plasticizer, a lubricant, an antistatic agent, and in particular, a color may optionally incorporated within the range not to impair the effect and function of the present invention. Further, in order to obtain a foamed structure or a three-dimensional structure, there may as required also be used various $CO_2$ generators, cross-linking agents and auxiliary agents.

It is important to disperse uniformly in the PET the above-mentioned crystallization accelerator, heat stabilizer, and other additives, since the uniformity greatly affects the performances of the finished container. There is no particular limit to the methods employed for adding and uniformly dispersing the additives, and examples of the methods include a process which comprises incorporating the additives such as crystallization accelerator during the polymerization of the PET; a process which comprises adding the PET in a desired percentage to master pellets obtained by dry blending the PET with the additives, and then melt-extruding the blend composition, followed by pelletization; a process which comprises directly using a pelletized resin obtained by dry blending the PET with the additives and then melt-extruding the blend, followed by pelletization; a process which comprises dry blending the PET with the additives and directly using the blend composition; and the like. Preferably used are the process which comprises incorporating the additives during the polymerization of the PET and the process which comprises directly using a pelletized resin obtained by dry blending the PET with the additives, and then melt-extruding the blend composition, followed by pelletization. Adjustment for the inherent viscosity of the obtained PET composition is made such that the viscosity as measured in a mixed solvent of phenol/tetrachlorethane (1:1 by weight) at 30° C. will be from 0.65 to 1.2 dl/g, preferably from 0.70 to 1.0 dl/g, and sometimes as occasions demand the adjustment is done by using a conventional solid-phase polymerization to increase the viscosity.

Optionally, there may be incorporated in the aforementioned crystalline PET a compound having crosslinking group(s) such as a multifunctional carboxylic and/or hydroxyl group of trifunctional or more in an amount of from 0.005 to 2 mol %. Where such a crystalline PET having crosslinking groups is used; in addition to the advantage in that even if the thickness of an EVOH layer is made large or if deep blowing is done, there does not occur any uneven elongation, breakage or irregularities in the gas barrier properties; molding is possible at a sheet temperature at thermoforming of as low as from 110° to 120° C., thereby suppressing a draw down caused by a high temperature heating which has been a big problem at thermoforming (130° to 150° C.) of polyester sheets, and also variations in container thickness resulting therefrom.

Examples of the compounds having multifunctional carboxylic groups or multifunctional hydroxylic groups include trimellitic acid, pyromellitic acid, pyromellitic acid dianhydride, 1,2,3-propanetricarboxylic acid, 1,2,3,4-benzenetetracarboxylic acid, and the like; or pentaerythrithrol, trimethylolethane, trimethylolpropane, trimethylolhexane, 1,3,5-trimethylolbenzene, glycerol, sorbitol and the like. These compounds may be used alone or in admixtures of more than two. Among the above particularly preferred are pentaerythrithol and trimethylol propane. The content of the multifunctional group is from 0.005 to 2 mol %, preferably from 0.01 to 1 mol %.

EVOH as used herein includes any saponified products of ethylene-vinyl acetate copolymers, among which particularly suited for the object of the present invention are ones containing from 25 to 60 mol % of ethylene unit, and having a saponification degree of vinyl acetate unit of at least 96%, preferably at least 99%, and a melt index (190° C., 2160 g) of from 0.2 to 60 g/10 min. Further EVOH referred to in the present invention may be those modified with a copolymerizable monomer in a range of not greater than 5 mol %. Example of such monomers for modification include propylene, 1-butene, 1-hexene, 4-methyl-1-pentene, acrylic acid esters, methacrylic acid esters, maleic acid, fumaric acid, itaconic acid, higher fatty acid vinyl esters, alkylvinyl ethers, N-(2-dimethylaminoethyl) methacryalmides or quaternized products thereof, N-vinylimidazole or quaternized products thereof, N-vinylpyrrolidone, N-n-butoxymethylacrylamide, vinyltrimethoxysilane, vinylmethyldimethoxysilane, vinyldimethylmethoxysilane, etc.

As the EVOH matrix, two or more EVOH resins having a different composition can also be mixed and used as a mixture. Further additives, for example, coloring agents such as pigments, dyes, etc., antistatic agents, UV absorbants, plasticizers, heat stabilizers, lubricants, etc. can be incorporated in the matrix within such a range that does not impair the effects of the present invention.

Further as the drying agent referred to in the present invention, there are suitable salts capable of forming hydrates, namely, salts which absorb water as the crystalline water, in particular, phosphates such as sodium dihydrogenphosphate, sodium monohydrogenphosphate, sodium phosphate, lithium phosphate and sodium pyrophosphate, etc., particularly anhydrides thereof are most suited for the present invention in view of the effects. Other hydrate-forming salts, for example, salts such as sodium borate, sodium sulfate, etc. and particularly anhydrides thereof are also suited for the present invention. Further other hydroscopic compounds, for example, sodium chloride, sodium nitrate, sugar, silica gel, bentonite, molecular sieve, highly water-absorbent resins, etc. may also be used. These drying agents can also be used in admixture of two or more simultaneously.

In the present invention, it is necessary that the drying agent be dispersed in the matrix of EVOH as fine grains and the drying agent grains have a volume-area average diameter of not greater than $30\mu$, preferably $25\mu$ or less, most preferably $20\mu$ or less, in the grains having a long diameter of $10\mu$ or more. By forming such a fine dispersion state, the multi-layer structure having a high gas permeability resistance that has not been hitherto achieved can be first obtained. The composition having such a fine dispersion state can be obtained only by careful combination of particular processings suited for the purpose.

First, it is desired to pay special attention to the drying agent in such a manner that the drying agent having a grain diameter as fine as possible be given upon precipitation from an aqueous solution of the salts through spray drying, etc. The drying agent grains can be classified into $30\mu$ or less, preferably $10\mu$ or less and then provided for use but, in general, the salts dried are subjected to pulverization using a jet mill, an impact mill, a ball mill, a vibration ball mill, etc. The ground grains are classified into ultrafine grains of $30\mu$ or less, preferably $10\mu$ or less, using a classification machine such as an air classification machine, etc. The $30\mu$ or less as used herein means that the grains exceeding $30\mu$ are less than 0.01% in the volume fraction, namely, the fine grains of $30\mu$ or less are present at least 99.9%. The graininess of the ultrafine grains is a value determined by the Coulter counter method. Upon the measurement of the graininess, the grains are preliminarily sieved through a sieve having a mesh of 10 to $75\mu$, if necessary, in order to condense a small amount of coarse grains and, the coarse grains of the sieve is analyzed by the Coulter counter method so that the coarse grains can be analyzed with high accuracy.

Next, the ultrafine grains of the drying agent described above are mixed with EVOH. For mixing, there are a method for mixing the fine grains of the drying agent with powders, grains or pellets of EVOH using a conventional mixer, for example, a Henschel mixer, a super mixer, a tumbling mixer, etc.; a method which comprises mixing the fine grains of the drying agent with a melt of EVOH to make a master batch and mixing the master batch with powders, grains, pellets or melts of EVOH. Then, the mixture is kneaded at temperatures higher than the melting point of EVOH to prepare the composition. EVOH and the drying agent grains may also be directly fed in a kneader to effect kneading, without preliminary mixing of EVOH and the drying agent grains as described above. Upon this kneading operation, the fine grains of the drying agent tend to be aggregated with each other; even if the ultrafine grains of $10\mu$ or less are used, the remarkable effects of the present invention cannot be obtained if the fine grains are agglomerated and the agglomerates exceeding the volume-area average diameter set in the present invention are formed. Accordingly, the kneading operation is extremely important in the present invention. As the kneader to give the composition having a high dispersion state, there are most suited continuous twin rotor kneaders such as a continous intensive mixer, a kneading type twin screw extruder (same directions or different direction), etc. but, there may also be used batch type twin rotor extruders such as a Banbury mixer, an intensive mixer, a pressure kneader, etc. Further as another continuous mixing devices, there may also be used rotary disks having an attrition mechanism such as a stone mill, e.g., KCK kneader Extruder manufactured by KCK Co., Ltd. Among kneaders conventionally used, there are a single screw kneader equipped with a kneading part (Dulmage, CTM, etc.) or handy type kneaders such as a Brabender mixer, etc.; in the case of using such kneaders, however, it is difficult to obtain the excellent composition of the present invention.

Of these kneaders, the most preferred kneader for the purposes of the present invention is a continuous intensive mixer. Commercially available models are FCM manufactured by Farrel Co., Ltd., CIM manufactured by The Japan Steel Works, Ltd., KCM, NCM, LCM or ACM manufactured by Kobe Steel Works, Ltd. and the like. From a practical standpoint, it is preferred that a device equipped with a kneader having mounted a single screw extruder beneath the kneader be adopted to perform kneading and extrusion pelletization simultaneously.

For the kneading purpose of the present invention, there may also be used a twin screw kneading extruder having kneading disks or kneading rotors, for example, TEX manufactured by The Japan Steel Works, Ltd., ZSK manufactured by Werner & Pfleiderer Co., Ltd., TEM manufactrued by Toshiba Machine Co., Ltd., PCM manufactured by Ikegai Iron Works, Inc., etc.

In using these continuous kneaders, the shape of a rotor or disk plays an important role. In particular, a gap (tip clearance) between a mixing chamber and a rotor tip or a disk top is important; if the gap is too narrow or two wide, the composition having good dispersion of the present invention cannot be obtained. It is most suited that the tip clearance be in the range of 1 to 5 mm.

In order to obtain the composition having good dispersion of the present invention, it has been found that kneading should be made in a unit work of the kneader of at least 0.1 kwh/kg, preferably 0.2 to 0.8 kwh/kg. The unit work is determined by dividing energy (quantity of electric power consumed; kw) used for the kneading by an amount (kg) of the kneading treatment per an hour and its unit is kwh/kg. In order to produce the composition of the present invention, it is required that the kneading be performed at a unit work value higher than that adopted for conventional kneading. To render the unit work at least 0.1 kwh/kg, it is insufficient to merely increase the rotation number of a kneader but it is preferred to cool the composition during kneading with a jacket, etc. thereby to lower the temperature and increase the viscosity. If the kneading is conducted in such a state that the viscosity is low, it is difficult to obtain the composition contemplated in the present invention. Therefore, it is effective to conduct the kneading at a kneading temperature ranging from the melting point of EVOH to a temperature higher than the melting point by 60° C., more preferably ranging from the melting point of EVOH to a temperature higher than the melting point by 40° C., at a discharged resin temperature in an outlet of a kneading part.

It is desired that the rotation number of a rotor of the kneader be in the range of 100 to 1200 rpm, preferably 200 to 1200 rpm, more preferably 400 to 1200 rpm. The inner diameter of the chamber in the kneader is generally 30 mm or more, preferably in the range of 50 to 400 mm (D). It is preferred that L/D of the kneader be 4 to 10. Further the kneader may be single or two or more kneaders combined together may also be used.

Longer the kneading time, the better the results; in view of thermal deterioration or change of EVOH or from an economic standpoint, however, the kneading time is generally in the range of 10 to 600 seconds, preferably 20 to 200 seconds, most preferably 20 to 100 seconds.

There is no particular restriction to the ratio of EVOH to the drying agent used but the ratio of 97:3 to 50:50, particularly 95:5 to 70:30, by weight, is preferred.

Measurement of the graininess of the drying agent grain in the composition is made by the microscopic method; in general, the graininess is determined by visual observation or an image analysis device with respect to a photography of the grains. In the present invention, it is required that among the dispersed grains, the volume-area average diameter of the grains having a long diameter of 10μ or more is not greater than 30μ. The long diameter as used herein means a distance between two parallel lines which give the longest distance when a projected image of each grain is inserted between the parallel lines. Regarding the grains having a long diameter of 10μ or more, an average grain diameter must be determined. Various methods are known to determine the average grain diameter; a convenient method suited for the purpose of the present invention is that an average value D of a long diameter L and a diameter B in the direction rectangular to L is rendered an average diameter. This method is one of the methods often adopted to one skilled in the art. Thus, when its average diameter $D_N$ is determined with respect to N pieces of grains in an appropriate measurement range (200μ × 200 μ), its volume-area average diameter $D_{AV}$ is defined as follows:

$$D_{AV} = \Sigma D_N^3 / \Sigma D_N^2$$

As has been made clear in the present invention, the volume-area average diameter of the grains having a long diameter of at least 10μ, among the drying agent grains in the composition of the present invention, greatly affects the gas permeability resistance of the multi-layer structure comprising this composition as a layer(s). The reason is not necessarily clear but it is assumed that grains having a large grain diameter would be particularly disadvantageous for a hygroscopic effect or gas permeability resistance of EVOH.

As the adhesive resin used in the present invention, any adhesive resins for PET and EVOH may be used, but choice should be made taking into consideration retortability and capability of electric cooking oven heating. Most preferred is a modified polyester comprising a dicarboxylic component and a glycol component, which contains one or more element selected from the group consisting of Al, Cr, Sn, Ge and Si in an amount of from 0.1 to 5 moles against 100 moles of the dicarboxylic acid unit. Among the elements, Al and Cr are, since they give large bond strengths, preferred, and Al is particularly preferred. Regarding the content of the element, where the content is less than 0.1 mole, the effect is not fully produced; on the other hand a content exceeding 5 moles will cause unfavorable phenomena such as gelation of the polymer and coloring. It is preferred that these elements be present in the polyester not as admixture therewith but in a state chemically bonded thereto, which state gives a higher bond strength. An example of methods for chemically bonding these elements to the polyester molecule is a process which comprises adding a compound of the aforementioned element (particularly preferred is metal ester, chelate compound, organic acid salt or the like) at the time of polymerisation of the polyester and conducting polymerization. Examples of Al compounds include aluminum acetylacetonate, aluminum ethoxide, aluminum propoxide and reaction products of these compound with a monocarboxylic acid; examples of Cr compounds include chromium acetylacetonate, chromium monocarbonates, and the like; examples of Sn compounds include tetraethyl stannate, tetrapropyl stannate, tetrabutyl stannate and reaction products of a monocarboxylic acid therewith; examples of Ge compounds include germanium dioxide; examples of Si compounds include methyltrimethoxysilane, methyltriethoxysilane, dimethyldimethoxysilane, diphenyldimethoxysilane, and the like. Particularly preferred are aluminum acetylacetonate, aluminum ethoxide and aluminum propoxide. These compounds are incorporated into a polyester polymerization system after near completion of the polyester polymerization and at below 230° C. They are added in a shape dissolved into a diol or dissloved into a monocarboxylic acid or its ester to prevent gelation of polymers during the polymerization.

Examples of the dicarboxylic acid component to constitute the polyester used as the adhesive resin in the present invention are aromatic dicarboxylic acids such as terephthalic acid, isophthalic acid, orthophthalic acid, naphthalenedicarboxylic acid, diphenyletherdicarboxylic acid and diphenyl-4,4'-dicarboxylic acid; aliphatic carboxylic acids such as oxalic acid, malonic acid, succinic acid, glutaric acid, adipic acid, pimeric acid, suberic acid, azelaic acid and sebacic acid; and alicyclic acids such as cyclohexanedicarboxylic acid. One or more than two of these compounds can be used.

Examples of the glycol components include aliphatic glycols such as ethylene glycol, 1,3-propanediol, 1,4-butanediol, 1,5-pentanediol, 1,6-hexanediol, 1,9-nonanediol, diethylene glycol and triethylene glycol; and alicyclic diols such as cyclohexanediol and cyclohexanedimethanol; and they are used alone or in combinations of more than two. Further a small amount of a tri-or more functional carboxylic acid or alcohol can optionally be used.

Preferred dicarboxylic acids are terephthalic acid, isophthalic acid and adipic acid; while preferred diols are ethylene glycol and diethylene glycol. The inherent viscosity of the obtained polyester is preferably at least 0.50 dl/g, more preferably at least 0.60 dl/g. The inherent viscosity herein is one measured in a phenol tetrachloroethane mixed solvent (1:1 in weight ratio) at 30° C.

As other adhesive resins used in this invention, mentions are made of a polyesteramide copolymer having a molar ratio of ester group/amide group of from 90/10 to 10/90. Examples of the dicarboxylic acid component to constitute the copolymer are aromatic dicarboxylic acids such as terephthalic acid, isophthalic acid, orthophthalic acid, naphthalenedicarboxylic acid, diphenyletherdicarboxylic acid and diphenyl-4,4'-dicarboxylic acid; aliphatic dicarboxylic acids such as oxalic acid, malonic acid, succinic acid, glutaric acid, adipic acid, pimeric acid, suberic acid, azelaic acid and sebacic acid; and alicyclic acids such as cyclohexanedicarboxylic acid. One or more than two of these compounds can be used. Examples of the glycol components include aliphatic glycols such as ethylene glycol, 1,3-propanediol, 1,4-butanediol, 1,5-pentanediol, 1,6-hexanediol, diethylene glycol and triethylene glycol; and alicyclic diols such as cyclohexanediol and cyclohexanedimethanol; and they are used alone or in combinations of two or more. Further a small amount of a tri-or more functional carboxylic acid or alcohol can optionally be used. Examples of the amide components include piperazine; diamines such as pentaethylenediamine, hexaethylenediamine, nonaethylenediamine, decaethylenediamine, undecaethylenediamine and nodecaethylenediamine; acid amides such as lauro lactam undecaneamide, hexamethylenesebacamide, hexamethyleneadipamide, ω-aminoheptanic acid and ω-aminononanic acid. Also used are melt-blended compositions of the above-mentioned copolymer with a polyester or a polyamide, and further blended compositions of a polyester with a polyamide. Where the ester group or the amide group is present at least 90%, the adhesion between the heat resistant PET and EVOH is insufficient for use. Molar ratios of ester group/amide group of from 85/15 to 15/85 are preferably used. Preferably used is a poly(ester-amide) comprising at least one compound each selected from: terephthalic acid, adipic acid, azelaic acid and succinic acid as a dicarboxylic acid component, ethylene glycol and 1,4-cyclohexanedimethanol as a glycol component, and piperazine as an amide component, the content of piperazine being from 30 to 90 mol % based on total moles of piperazine and the glycol component(s); or a composition of a polyester comprising at least one compound selected from: terephthalic acid, azdipic acid, azelaic acid and succinic acid as a dicarboxylic acid component; and ethylene glycol and 1,4-cyclohexanedimethanol as a glycol component, and 6 nylon, 6–66 nylon, 66 nylon, 6–12 nylon or 6–9 nylon melt-blended with the above polyester in an amount of from 10 to 80% by weight.

In the present invention, there is employed as a method for producing the heat-resistant multi-layer container, a process which comprises getting a multi-layer sheet or parison of the EVOH composition and the crystalline PET with the adhesive resin inbetween by extrusion lamination, dry lamination, co-extrusion lamination, co-extrusion sheet preparation (feed block process, multi-manifold process, or the like), co-extrusion direct blowing, co-extrusion piping, co-injection, various solution coatings, or the like; but there is also a process of directly producting the molded container. Where a container is obtained by the direct producing process, the obtained container is heat-treated in a mold heated to a temperature sufficiently high for achieving a desired crystallization degree, thereby acquiring a heat resistance. The temperature of the mold is in a range of from 150° to 215° C., preferably from 160° to 200° C.; and the container is kept in the mold for 2 to 60 seconds, preferably for 2 to 20 seconds. On the other hand, where the container is obtained from a multi-layer sheet or parison by a secondary processing, it is important to rapidly cooling the multi-layer sheet or parison just after the molding, to minimize the growth of crystallization generating after the molding. The obtained multi-layer sheet or parison (hereinafter referred to as "multi-layer structure") is thermoformed by heating as rapidly as possible, the thermoforming temperature being in a range of from 110° to 170° C., preferably from 120° to 160° C. There is no particular limit to the moisture content of the EVOH constituting the multi-layer structure when it is thermoformed, but the moisture content is preferably lower than from 0.01 to 5%. The thus thermoformed container is heat-treated in a mold heated to a temperature sufficiently high for achieving the desired crystallization degree, thereby getting a heat resistance. The temperature of the mold is in a range of from 150° to 215° C., preferably from 160° to 200° C.; and the container is kept in the mold for 2 to 60 seconds, preferably for 2 to 20 seconds. Since the molded article is heated to a high temperature and is therefore soft, special attention should be paid when taking it out of the mold, and as occasions demand reputting it into a cooled mold or blowing cold air into the mold is performed to straighten the shape. The thus molded article has a shrinkage ratio at the container body (longitudinal direction) of less than 10%, preferably less than 6% when heated in an electric cooking oven at 200 °C. for 30 minutes. The shrinkage ratio at the container body (longitudinal derection) herein is a value represented by: 100×(size before heating−size after heating)/size before heating.

There are no particular limits either to the shape of the molded articles of the multi-layer structure. They may be shaped to tray, cup or bottle. The drawing ratio for processing secondarily the multi-layer structure into a molded article is not more than 20 times in area ratio, preferably from 3 to 15 times.

Scraps or wastes formed upon trimming when obtaining the molded article are granulated and thereafter directly, or after being pelletized, recovered for use. The recovery methods are not particularly limited, but include, after granulation, a process which comproses drying the granules if they have absorbed moisture and then dry blending the granule with the raw material PET; a process which comprises pelletizing the granulated scrap, and thereafter dry blending with the raw material PET; a process which comprises blend-pelletizing the raw material PET with the granulated scrap, and the like. The ratio of blending the scrap with the raw material PET composition is normally from about 2 to 100%. It is often preferred, when recovering the scrap, to add at least one compounds of metal soaps (aliphatic and/or aromatic carboxylic acid salt or the like), chelate compounds (EDTA and the like), and alkali metal salts or alkali earth metal salts of carboxylic acids.

Representative examples of construction of the multi-layer structure are crystalline PET/EVOH composition/crystalline PET, crystalline PET/adhesive resin/EVOH composition/adhesive resin/crystalline PET, crystalline PET/adhesive resin/EVOH composition/adhesive resin/crystalline PET/PET, crystalline PET/adhesive resin/EVOH composition/adhesive resin/PET, PET/crystalline PET/adhesive resin/EVOH composition/adhesive resin/crystalline PET/PET, crystalline PET/recovery/adhesive resin/EVOH composition/adhesive resin/crystalline PET, crystalline PET/recovery/adhesive resin/EVOH composition/adhesive resin/recovery/crystalline PET, crystalline PET/recovery/adhesive resin/EVOH composition/adhesive resin/crystalline PET/PET, PET/crystalline PET/recovery/adhesive resin/EVOH composition/adhesive resin/crystalline PET, and others. Among the above constructions, one with EVOH composition layer provided on its both surface crystalline PET layers via addhesive resin layers is preferred.

Instead of PET, other heat-resistant resin such as polyamide, polyetherimide, polysulfone, polyphthalatecarbonate, polycarbonate, or the like may also be used. The thickness construction is not particularly limited; but generally, the total thickness of the container body is from 200μ to 2000μ, while the thickness of the EVOH layer is from 2μ to 200μ and that of the adhesive resin layer is from 2μ to 200μ.

The thus obtained multi-layer container of the present invention is a food container having an excellent gas barrier property and an excellent heat resistance, which is capable of storing foods for a long period at a room temperature, as well as heatable as it is, without transferring the food contained to another container, by boiling, in a microwave and in an electric cooking oven (200° C.). In particular, containers utilizing the EVOH composition incorporating a drying agent of the present invention exhibit an excellent effect in that there hardly occurs the deformation or delamination of the containers when they are heated in an electric cooking oven or in a microwave. The reason for this is estimated to lie in an unexpected fact that the heat resistance of EVOH composition remarkably increases when the composition incorporates a drying agent. The container is also useful in the field where odor-retaining property is required.

Next, another embodiment of the present invention is described below.

While, as stated before, the container comprising an EVOH layer incorporating a drying agent and a crystalline PET layer(s) provided on at least one surface of the EVOH layer is best in that it is retortable and ovenable, the container comprising an EVOH layer not incorporating any drying agent and a crystalline PET layer(s) provided on at least one surface of the EVOH layer can also undergo heating in a microwave or an electric cooking oven. Though this container decreases, as also stated before, when subjected to a retort treatment, its gas barrier property caused by moisture absorption by the EVOH, it has a high heat resistance. Further, by selecting a proper interlayer adhesive resin, for example the afore-mentioned polyester-related adhesive, between the EVOH layer and a crystalline PET layer, there can be obtained a container which yields no interlayer delamination and has an excellent shock resistance, and besides, produces no coloring of the adhesive resin or odor generation. The container thus obtained is also excellent in dimensional stability, the shrinkage ratio at the container body (longitudinal direction) when heated in an electric cooking oven at 220° C. for 30 minutes of not more than 10%; and in particular, exhibits a great performance when the construction is crystalline PET/adhesive resin/EVOH/adhesive resin/crystalline PET. Also effective is a construction crystalline PET/adhesive resin/EVOH/adhesive resin if required/other thermoplastic resin having a melting point of at least 200° C. As the other thermoplastic resin having a melting point of at least 200° C. used herein, a resin having a melting point of at least 220° C. and a high moisture permeability such as polyamide or polyacrbonate is preferred. These containers can well withstand heating in an electric cooking oven, which will be apparent from Examples 15 through 26 described herein later.

Hereinbelow the present invention will be explained in more detail by reference to Examples, but the present invention is by no means limited by the Examples. In the Examples "parts" means parts by weight.

EXAMPLES

Example 1

Ultrapulverization and classification of anhydrous sodium monohydrogenphosphate was performed using a jet pulverizer (MICRON JET MJ-3, made by Hosokawa Micron Co.) and a pneumatic classifier (MICRON SEPARATOR, made by the same company). After dispersing the raw material powder in methanol, observation was made with a loupe to find that there are contained a number of particles having diameters of at least 500μ and having an average particle diameter (median diameter) as determined with a Coulter Counter of 86μ. Similarly, fine powder after the ultrapulverization gave a maximum particle diameter (with Coulter Counter) of 13μ and a median diameter of 6.4μ (powders having particle diameter of at least 13μ was contained in an amount less than 0.1%).

20 parts of the thus obtained anhydrous sodium monohydrogenphosphate and 80 parts of EVOH [content of ethylene unit: 32 mol %, melt index measured at 190° C. under a load of 2160 g: 1.3 g/10 min, and melting point (primary exotherm temperature on DSC; scanning speed: 10° C./min): 181° C.] were mixed with each other first preliminary in a Henschel Mixer and thereafter by high speed mixing to obtain a mixture. After that, the mixture was subjected to blend-extrusion-pelletization in a 2-stage twin-screw different-direction continuous kneader having an inner diameter of mixing chamber of 54 mm (D), L/D=5.8 (first stage) and L/D=4.2 (second stage) (LCM-50, made by Kobe Steel Works, Ltd.) and a single-screw extruder connected therewith, to give pellets of the composition (EVOH Composition 1). The operation was conducted with a rotor having a chip clearance between the mixing chamber of 3 mm; a kneading temperature (at outlet) of from 206° to 220° C., a kneading time of from 30 to 40 seconds, a rotor rotation of from 530 to 650 rpm and a unit work of from 0.3 to 0.6 kwh/kg. The thus obtained pellets were pressed in a hot press at 220° C. to give a thin film having a thickness of about 100μ. Observation on the thin film was made with an optical microscope for state of dispersion of powders. A photograph of magnification 800 was taken. This was done by setting the magnification of the microscope at 50 to increase the depth of focus, and by succeedingly enlarging to a total magnification of 800 times. The average diameter of particles having long diameters of at least 10μ, was determined which then calculated the volume-area average diameter of 17.6μ.

As the crystalline PET there was used a polyester composition obtained by dry blending 100 parts of an unmodified polyethylene terephthalate having an inherent viscosity of 0.90 dl/g with 3 parts of a low density polyethylene having a MI (190° C., 2160 g) of 5.0 g/10 min, 1.2 parts of TiO$_2$ as a pigment and 0.5 part of Irganox 1010 (made by Ciba-Geigy) as a heat stabilizer, and thereafter pelletizing the composition with a 40-φ extruder of twin-screw and vent type, followed by drying at 150° C. for 8 hours.

As the adhesive resin, a polyester resin obtained by the following method was used. A polymerization tank equipped with a nitrogen gas inlet, a stirrer and a cooling pipe was charged with 64 parts of bis-β-hydroxyethyl terephthalate, 36.5 parts of adipic acid, 15.5 parts of ethylene glycol, 14.9 parts of diethylene glycol and 0.04 part of antimonium trioxide, followed by reaction at 200° C. for 4 hours. The resulting reaction solution was added with an organic aluminum compound separately prepared in an amount converted to aluminum atom of 0.08 part and 0.02 part of tributyl phosphate, and the mixture was first heated to 250° C. and, while gradually depressurizing, further to 270° C., followed by polymerization under a reduced pressure of 0.1 mmHg for 90 minutes, to give a resin. The inherent viscosity of the resin was 0.1 dl/g and the glass transition temperature was −5° C.

A co-extrusion was conducted using a co-extrusion sheet forming machine having 3 extruders, a 3 kind/5 layer feed block and a take-up, to obtain a multi-layer structured sheet having a construction of crystalline PET/adhesive resin/EVOH Composition 1/adhesive resin/crystalline PET (thicknesses: 900/50/100/50/900µ). The obtained sheet was thermoformed with a vacuum pressure forming machine (made by Asano Machine Works Ltd.) to give a cup-shape container (opening diameter: 72 mm, bottom diameter: 65 mm, and height: 35 mm). The thermoforming was conducted under conditions of draw forming a sheet at 130° C. and then heat-setting in a mold at 180° C. for 10 seconds. The obtained container had a good appearance. When the empty container was heated in an electric cooking oven at 220° C. for 20 minutes, the shrinkage ratio (longitudinal size change of the container) was less than 3%, and the then container showed a good appearance and no deformation or delamination.

The thus thermoformed container was filled with water, and thereafter heatsealed with a stopper of a multi-layer film comprising an aluminum foil (60µ) and a polyester sealant resin layer (15µ) laminated on the aluminum foil. The thus sealed containers were then heat-treated with hot water at 120° C. for three periods of 30 minutes, 60 minutes and 120 minutes using a retorting apparatus (high temperature and high pressure cooking sterilization tester, RCS-40RTGN, made by Hisaka Seisakusho Co.), followed by storage in a testing room with an atmosphere of 20° C. and 65% RH. After storing 6 months, the oxygen concentrations in the containers were measured. The results are shown in Table 1. The oxygen concentrations of the containers of the present invention were all less than 5 ppm, which are sufficiently good for storing foods.

One of the rest of the thermoformed containers was filled with meat source, heatsealed and in the same manner as above retorted for 60 minutes, followed by storage for 6 months in an atmosphere of 20° C. and 65% RH. After the storage, the container was opened. The meat source showed no discoloration and tasted good.

Portions of the cup container before retorting were cut out, and heated in xylene at 120° C. to remove crystalline PET and adhesive resin by dissolution, to give films of the EVOH composition in the container. Observation on the obtained films was made with an optical microscope for state of dispersion of powders. Photographs of magnification 800 were taken. This was done by setting the magnification of the microscope at 50 to increase the depth of focus, and by succeedingly enlarging to a total magnification of 800 times. From the photographs, average diameters of particles having long diameters of at least 10µ present in a region measuring 200µ×200µ each on 10 separately positioned specimens on the container wall, were measured, followed by calculation of a volume-area average diameter to be 17.7µ.

Separately, the co-extrusion molding, thermoforming and retorting of Example 1 was repeated by using, instead of EVOH Composition 1 described in Example 1, the EVOH which was also described in Example 1. After an storage over 6 months, the oxygen concentration was measured. The results are also shown in Table 1. The concentrations measured are about 5 times those obtained on EVOH Composition 1.

The container was filled with meat sauce, retorted for 60 minutes and thereafter stored for 6 months. After the storage the container was opened. The meat sauce showed, though slightly, a discoloration.

TABLE 1

| | (after 6 month, ppm) Intermediate layer | Oxygen concentration in the cup Retorted for: | | |
|---|---|---|---|---|
| | | 30 min | 60 min | 120 min |
| Example 1 | Composition 1 | 2.0 | 3.6 | 4.4 |
| | EVOH | 10.3 | 15.1 | 18.6 |

EXAMPLES 2 THROUGH 10

Ultrapulverization of various drying agents was conducted. The obtained fine powders were used instead of the anhydrous sodium monohydrogenphosphate powder of Example 1, and kneaded and extruded with the EVOH (of Example 1) to give pellets of corresponding compositions. The pellets were co-extrusion molded and then thermoformed into cups. The obtained cups were retorted and thereafter stored for 6 months. The oxygen concentrations in the cups after the storage were measured, and the intermediate layers of the cups were taken out for observation with a microscope, from which the volume-area average diameter ($D_{av}$) each was calculated for the dispersed drying agent particles having long diameters of at least 10µ. The results are shown in Table 2.

The storing capabilities of the compositions of the present invention, particularly the compositions utilizing drying agents of Examples 2 through 5 were remarkably high, and were sufficient for storing various types of food. In Examples 6 and 7, or 8 through 10, the cups exhibited remarkable storing capability when retorted for 30 minutes, which retorting is sufficient for a variety of foods; however, they show some tendency to decrease in storing capabilities when retorted as long as 120 minutes.

Separately, the obtained empty cups were heated in an electric cooking oven for 20 minutes. After the heating the cups still had good appearances and showed no delamination.

TABLE 2

| Example | Drying agent | $D_{av}\mu$ | Oxygen concentration in the cup (after being kept for 6 months, ppm) | | |
|---|---|---|---|---|---|
| | | | Retorted for 30 min. | Retorted for 60 min. | Retorted for 120 min. |
| 2 | Anhydrous sodium pyrophosphate | 24.8 | 2.8 | 4.4 | 6.5 |
| 3 | Anhydrous sodium phosphate | 12.9 | 2.1 | 4.2 | 5.5 |
| 4 | Anhydrous sodium dihydrogenphosphate | 12.8 | 2.4 | 4.0 | 4.9 |
| 5 | Anhydrous lithium phosphate | 21.5 | 1.9 | 3.5 | 4.3 |
| 6 | Anhydrous sodium | 13.1 | 3.1 | 5.1 | 8.0 |

TABLE 2-continued

| Example | Drying agent | $D_{av'\mu}$ | Oxygen concentration in the cup (after being kept for 6 months, ppm) | | |
|---|---|---|---|---|---|
| | | | Retorted for 30 min. | Retorted for 60 min. | Retorted for 120 min. |
| | borate | | | | |
| 7 | Anhydrous sodium sulphate | 13.0 | 4.2 | 6.8 | 9.7 |
| 8 | Sodium nitrate | 17.6 | 4.3 | 8.8 | 11.0 |
| 9 | Sodium chloride | 15.5 | 4.4 | 9.6 | 13.0 |
| 10 | Sucrose | 21.0 | 4.8 | 9.9 | 13.9 |

EXAMPLE 11

Example 1 was repeated except for replacing low density polyethylene to polypropylene, which are crystallization accelerators. The obtained container was good, showed a shrinkage ratio after being heated at 220° C. in an electric cooking oven of 4%, and showed also a good appearance after the heating. The container was filled with meat sauce, retorted for 60 minutes, and stored for 6 months. After the storage the container was opened. The meat sauce showed no discoloration and tasted good.

EXAMPLE 12

Example 1 was repeated except for increasing the incorporation amount of the crystallization accelerator from 3% by weight to 6% by weight. The obtained container was good, showed a shrinkage ratio after being heated at 220° C. in an electric cooking oven of 4%, and showed a good appearance after the heating. The container also passed the test for storing capability using meat sauce.

EXAMPLE 13

Example 1 was repeated except for replacing the adhesive resin to a poly(ester-amide) having an inherent viscosity of 0.75 dl/g comprising a copolyester (1,4-cyclohexanedimethyl/azelate=9/50 by mole) modified with 41 mol % of piperadine. The then molar ratio of ester group/amide group was 18/22. The obtained container was good, showed a shrinkage ratio after being heated at 220° C. in an electric cooking oven of 4%, which was good. The container also passed the test for storing capability using meat sauce.

EXAMPLE 14

Example 1 was repeated except for replacing the adhesive resin to pellets of a resin obtained by blending 100 parts of a copolyester (ethylene/isophthalate/-terephthalate) modified with 35 mol % of isophthalic acid, having an inherent viscosity of 0.75 dl/g, with 80 parts of 6–66 nylon, followed by pelletization using a 40-$\phi$ twin-screw vent-type extruder and drying at 150° C. for 8 hours. The then molar ratio of ester group/amide group was 60/40. The obtained container was good, showed a shrinkage ratio after being heated at 220° C. in an electric cooking oven of 3.5%, which was good. The heat-treated container showed only slight discoloration in its appearance, which was no problem for practical use. The container also passed the test for storing capability using meat sauce.

EXAMPLE 15

An EVOH having a melt index (MI; 190° C., 2160 g) of 1.6 g/10 min comprising 44 mol % of ethylene having a saponification degree of 99.4% incorporating 0.02 mol % of vinyltrimethoxysilane was used as EVOH component.

As the heat-resistant crystalline PET there was used a polyester composition obtained by dry blending 100 parts of an unmodified polyethylene terephthalate having an inherent viscosity of 0.90 dl/g with 3 parts of a low density polyethylene having a MI (190° C., 2160 g) of 5.0 g/10 min, 1.2 parts of $TiO_2$ as a pigment and 0.5 part of Irganox 1010 (made by Ciba-Geigy) as a heat stabilizer, and thereafter pelletizing the composition with a 40-$\phi$ extruder of twin-screw and vent type, followed by drying at 150° C. for 8 hours.

As the adhesive resin, a polyester resin obtained by the following method was used. A polymerization apparatus comprising a 300-ml three-neck flask equipped with a nitrogen gas inlet, a stirrer and a cooling pipe was charged with 64 g of bis-$\beta$-hydroxyethyl terephthalate, 36.5 g of adipic acid, 15.5 g of ethylene glycol, 14.9 g of diethylene glycol and 40 mg of antimonium trioxide, followed by reaction at 200° C. for 4 hours. The resulting reaction solution was added with an aluminum compound in an amount converted to aluminum atom of 0.52 mole to 100 moles of dicarboxylic acid component, which aluminum compound had been obtained by reacting 200 ml of hexylene glycol with 0.20 mole of aluminum isopropoxide, 0.10 mole of capric acid, 0.30 mole of p-oxybenzoic acid and 0.20 mole of acetylacetone, at 100° C.; and further added with 25 $\mu$l of tributyl phosphate; and the mixture was first heated to 250° C. and, while gradually depressurizing, further to 270° C., followed by polymerization at the temperature under a reduced pressure of 0.1 mmHg for 90 minutes, to give a resin. The inherent viscosity of the resin was 0.61 dl/g and the glass transition temperature was −5° C.

A co-extrusion was conducted using a 3 kind/5 layer co-extruder to obtain a sheet. The construction of the obtained sheet is as shown in Table 3. The obtained sheet was thermoformed with a vacuum pressure forming machine equipped with a round-cup mold at the sheet temperature of 130° C. and at a drawing ratio of 1. The obtained cup was heat set at the mold temperature of 180° C. for 10 seconds. The obtained container had a good appearance. When the container was heated in an electric cooking oven at 220° C. for 20 minutes, the shrinkage ratio (longitudinal) was 3%, the shrinkage ratio being a value calculated by the formula: 100×(size before heating−size after heating)/size before heating. The container after the heating showed a good appearance. The gas barrier property of the EVOH layer of the container was measured at 20° C.-65% RH with TYPE 10/50 made by Mocon Company to give 1.8 cc·20 $\mu$/m$^2$·24 hr·atm before the heating and 1.7 cc·20 $\mu$/m$^2$·24 hr·atm after the heating, both of which are excellent.

The container before heating was filled with salad oil and heatsealed on the top with a 100-$\mu$ biaxially drawn PET film laminated thereon with a sealant. The container was then dropped onto concrete floor at 20° C. to measure the dropping impact strength (height dropped). The results were that the height dropped by which 5 containers from total of 10 were at least 1.5 m, which proves a high resistance to dropping shock. The height dropped at −20° C. was 1 m.

The containers were sterilized by boiling at 80° C. for 2 hours and by steam sterilization at 121° C. for 30 minutes separately, and thereafter allowed to stand for 3 days at 20° C., 65% RH. Then the caps of the containers were opened and the containers were heated in a microwave for 5 minutes. Both containers showed good appearances. The then temperature of salad oil was 180° C. Also, they showed good appearances when they were heated in an electric cooking oven at 220° C. for 30 minutes. Further, the containers, one boiled and the other steam sterilized, were opened and removed of the salad oil, and thereafter the empty containers were heated in an electric cooking oven at 220° C. for 30 minutes. Both show no delamination or deformation, and they had good appearances. The gas barrier properties of the containers were measured at 20° C.-65% RH to give all nearly the same value of 1.8 cc·20 μ/m²·24 hr·atm, which is excellent.

EXAMPLE 16

Example 15 was repeated except for using an EVOH comprising 32 mol % of ethylene and having a saponification degree of 99.6% and MI (190° C., 2160 g) of 1.6 g/10 min, the EVOH not containing Si. The results are shown in Table 3.

EXAMPLE 17

Example 15 was repeated except for using an EVOH comprising 32 mol % of ethylene and having a saponification degree of 99.4% and MI (190° C., 2160 g) of 1.6 g/10 min, the EVOH incorporating 0.3 mol % of vinyltrimethoxysilane, changing the thickness of the intermediate EVOH layer to 15μ, and further changing the adhesive resin to one obtained by the following process: The same polymerization apparatus used in Example 15 was charged with 64 g of bis-β-hydroxyethyl terephthalate, 4.6 g of isophthalic acid, 24 g of sebacic acid, 30 g of ethylene glycol, and 40 mg of antimony trioxide, followed by reaction at 200° C. for 4 hours. The resulting reaction solution was added with the same aluminum compound used in Example 15 in an amount converted to aluminum atom of 0.52 mole to 100 moles of dicarboxylic acid component, and further added with 25 μl of tributyl phosphate; and the mixture was first heated to 250° C. and, while gradually depressurizing, further to 270° C., followed by polymerization at the temperature under a reduced pressure of 0.1 mmHg for 100 minutes, to give a resin. The inherent viscosity of the thus obtained resin was 0.72 dl/g and the glass transition temperature and the melting point were 15° C. and 149° C. respectively. The results are shown in Table 3.

EXAMPLE 18

Example 15 was repeated except for using as an adhesive resin a poly(ester-amide) having an inherent viscosity of 0.75 dl/g comprising a copolyester modified with 41 mol % of piperadine: [poly(piperadine/1,4-cyclohexanedimethanol/azelate=41/9/50 (molar ratio)]. The then molar ratio of ester group/amide group was 18/82. The results are shown in Table 3.

EXAMPLE 19

Example 15 was repeated except for using as an adhesive resin a resin obtained by blending 100 parts of a polyester having an inherent viscosity of 0.75 dl/g modified with 35 mol % of isophthalic acid: [poly(ethylene/isophthalate/terephthalate=50/35/15 (molar ratio)] with 80 parts of 6-66 nylon, followed by pelletization using a 40-φ twin-screw vent-type extruder, and then by drying at 150° C. for 8 hours. The then molar ratio of ester group/amide group was 60/40. The results are shown in Table 3.

EXAMPLE 20

Trims and rejected cups having generated during the thermoformation in Example 15 were slit, dried at 150° C. for 8 hours in vacuo, and thereafter fed to a 40-φ vent-type extruder, followed by pelletization. The obtained pellets were dried (150° C., 8 hours in vacuo). Using the pellets, a sheet having a construction of outer PET composition layer of 500μ thickness/recovery layer (content of the heat-resistant PET composition: 80%) of 300μ thickness/adhesive resin layer of 50μ thickness/PET composition layer of 50μ thickness was obtained. The results of evaluations made in the same manner as in Example 15 are shown in Table 3.

TABLE 3

| | Thickness construction of raw sheet (μ) (Average thickness of container body) | | | | | | Appearance of formed articles | Gas barrier 20° C.-65% RH(cc · 20 μ/m² · day · atm) | Drop test (65% RH) (m) |
|---|---|---|---|---|---|---|---|---|---|
| | PET Composition (B) | Recovery layer | Adhesive resin (D) | EVOH (A) | Adhesive resin (D) | PET Composition (C) | | | |
| Example 15 | 750 (250) | — | 50 (17) | 25 (8) | 50 (17) | 50 (17) | O | 1.8 | 1.5 |
| Example 16 | 750 (250) | — | 50 (17) | 25 (8) | 50 (17) | 50 (17) | O | 0.6 | 1.4 |
| Example 17 | 750 (250) | — | 50 (17) | 25 (5) | 50 (17) | 50 (17) | O | 0.5 | 1.6 |
| Example 18 | 750 (250) | — | 50 (17) | 25 (8) | 50 (17) | 50 (17) | O | 1.8 | 1.8 |
| Example 19 | 750 (250) | — | 50 (17) | 25 (8) | 50 (17) | 50 (17) | O | 1.7 | 1.7 |
| Example 20 | 500 (170) | 300 (100) | 50 (17) | 25 (8) | 50 (17) | 50 (17) | O | 1.6 | 1.4 |

| Heat shrinkage (220° C., | Appearance after heat sterilization | | Cup heating test done 3 days after heat sterilization | | |
|---|---|---|---|---|---|
| | at 80° C. | at 121° C. | Microwave, filled | Cooking oven of 220° C. | Cooking oven |

TABLE 3-continued

| | 30 min) (%) | for 2 hr | for 30 min | with salad oil | filled with salad oil | of 220° C., empty |
|---|---|---|---|---|---|---|
| Example 15 | 3.0 | O | O | O | O | O |
| Example 16 | 3.2 | O | O | O | O | A little delamination |
| Example 17 | 2.7 | O | O | O | O | O |
| Example 18 | 2.1 | O | O | O | O | O |
| Example 19 | 2.5 | O | O | O | O | O |
| Example 20 | 2.5 | O | O | O | O | O |

Note:
"O" means a good appearance.

EXAMPLE 21

An EVOH having a melt index (MI; 190° C., 2160 g) of 1.5 g/10 min comprosing 32 mol % of ethylene, and having a saponification degree of 99.4%.

As the heat-resistant crystalline PET there was used a heat-resistant polyester composition obtained by dry blending 100 parts of a polyethylene terephthalate having an inherent viscosity of 0.90 dl/g incorporating 0.1 mol % of pentaerythrithol and 0.64% of benzoic acid, with 3 parts of a low density polyethylene having a MI (190° C., 2160 g) of 5.0 g/10 min, 1.2 parts of $TiO_2$ as a pigment and 0.5 part of Irganox 1010 (made by Ciba-Geigy) as a heat stabilizer. The composition was then pelletized at 280° C. with a 40-$\phi$ extruder of twin-screw and vent type, followed by drying at 150° C. for 8 hours.

As the adhesive resin, a resin comprising a polyolefin modified with maleic anhydride (ADMER AT469C, made by Mitsui Petrochemical Co.) was used.

A co-extrusion was conducted using the resins obtained above, with a 3 kind/5 layer co-extruder to obtain a sheet. The construction of the obtained sheet was PET composition (800$\mu$)/adhesive resin (50$\mu$)/EVOH (200$\mu$)/adhesive resin (50$\mu$)/PET composition (800$\mu$)/. The obtained sheet was thermoformed with a vacuum pressure forming machine equipped with a round-cup mold at the sheet temperature of 130° C. and at a blowing ratio of 1. The obtained cup was heat set at the mold temperature of 180° C. for 10 seconds. The obtained container had a good appeatance. When the container was heated in an electric cooking oven at 220° C. for 30 minutes, the shrinkage ratio (longitudinal) was 3%, the shrinkage ratio being a value calculated from the formula: 100×(size before heating−size after heating)/size before heating. The container after the heating still showed a good appearance. The gas barrier properties of 10 pieces of the containers were determined with Type 10/50 made by Mocon Co. to give an average value of $O_2$ gas permeability of 0.5 cc·20 $\mu/m^2$·day·atm and a range R (maximum-minimum) of 0.15 cc·20 $\mu/m^2$·day·atm, both of which are excellent, proving that the container is highly reliable.

EXAMPLE 22

Example 21 was repeated except for:

changing the EVOH to a modified EVOH having a MI (190° C.) of 1.8 g/10 min, comprising ehylene unit in an amount of 28 mol % and having a saponification degree of 99.4%, the EVOH incorporating 0.02 mol % of vinyltrimethoxysilane, and changing the adhesive resin to a poly(ester-amide) having an inherent viscosity of 0.70 dl/g comprising azelaic acid/cyclohexane dimethanol/piperadine (molar ratio: 0.45/0.10/0.45).

The obtained container was good; and when heated at 220° C. for 30 minutes in an electric cooding oven, the container showed heat shrinkage of as small as 3.4% and no deformation, distortion or slackening. 10 pieces of the containers were evaluated for gas barrier property at 20° C., 65% RH, to give an average $O_2$ permeability of 0.1 cc·20 $\mu/m^2$·day·atm and a range R (maximum-minimum) of 0.05 cc·20 $\mu/m^2$·day·atm, both of which proving that the container is excellent heat-resistant container.

EXAMPLES 23 AND 24

Details of prescriptions and results obtained are shown in Table 5.

EXAMPLE 25

Example 21 was repeated except for changing the lenear low density polyethylene to a high density polyethylene (MI: 5.3 g/10 min). The results are shown in Table 5.

EXAMPLE 26

Example 21 was repeated except for changing pentaerythrithol (0.1 mol %) to trimethylolpropane (0.24 mol %) and changing the lenear low density polyethylene to a polypropylene (MI: 7.0 g/10 min). The results are shown in Table 5.

TABLE 4

| | Raw materials (characteristics) | | | | | Thickness construction of sheet | |
|---|---|---|---|---|---|---|---|
| | EVOH | | Polyethylene terephthalate | | | | |
| | $C_2H_4$ content (mol %) | $MI_{190\ °C.}$ (g/10 min) | Multi-functional monomer | Amount added (mol %) | Adhesive resin | Total ($\mu$) | EVOH layer ($\mu$) |
| Example 21 | 32 | 1.6 | pentaerythritol | 0.1 | Admer AT469C | 1100 | 200 |
| Example 22 | 28 | 1.8 | pentaery- | 0.08 | azelaic acid/ | 1100 | 200 |

TABLE 4-continued

|  |  |  | thritol |  | cyclohexane dimethanol/ piperadine- related polyesteramide |  |  |
|---|---|---|---|---|---|---|---|
| Example 23 | 28 | 1.8 | pentaery-thritol | 0.15 | Admer AT469C | 1100 | 200 |
| Example 24 | 32 | 1.6 | trimethylol propane | 0.24 | Admer AT469C | 1100 | 200 |
| Example 25 | 32 | 1.6 | pentaery-thritol | 0.1 | Admer AT469C | 1100 | 200 |
| Example 26 | 32 | 1.6 | trimethylol propane | 0.24 | Admer AT469C | 1100 | 200 |

| | | Container properties | | | | |
|---|---|---|---|---|---|---|
| | Diameter/ height ratio of container | heated at 220° C. for 30 min | | $O_2$ gas perme- ability (n = 10) cc · 20μ/(m² · day · atm) | | Shrinkage (%) |
| | | Appearance before heating | Appearance After heating | Average | R | |
| Example 21 | 0.4 | good | good | 0.5 | 0.15 | 3.1 |
| Example 22 | 0.4 | good | good | 0.1 | 0.05 | 4.4 |
| Example 23 | 0.4 | good | good | 0.1 | 0.05 | 3.6 |
| Example 24 | 0.4 | good | good | 0.4 | 0.20 | 3.5 |
| Example 25 | 0.4 | good | good | 0.5 | 0.10 | 4.0 |
| Example 26 | 0.4 | good | good | 0.6 | 0.15 | 3.6 |

What is claimed is:

1. A heat resistant container suitable for retort treatment and ovenability comprising an ethylene-vinyl alcohol copolymer layer containing a drying agent and a crystalline polyester resin layer, said crystalline polyester resin layer comprising a thermoplastic polyester and a crystallization accelerator consisting essentially of a polyolefin.

2. A heat-resistant container as defined in claim 1, wherein said thermoplastic polyester contains at least 80 mol % of ethylene terephthalate units.

3. A heat-resistant container as defined in claim 1, wherein the ratio of said ethylene-vinyl alcohol copolymer to said drying agent is from 97:3 to 50:50 by weight.

4. A heat-resistant container as defined in claim 1, wherein said drying agent is a salt capable of forming hydrates.

5. A heat-resistant container as defined in claim 1, wherein said drying agent is at least one member selected from the group consisting of sodium dihydrogenphosphate, sodium monohydrogen phosphate, sodium phosphate and sodium pyrophosphate.

6. A heat-resistant container as defined in claim 1, wherein said ethylene-vinyl alcohol is a saponified product of ethylene-vinyl acetate copolymer having from 25 to 60 mol % of ethylene unit and a saponification degree of vinyl acetate unit of at least 96%.

7. A heat resistant container as defined in claim 1, further comprising an adhesive layer interposed between said ethylene-vinyl alcohol copolymer layer and said crystalline polyester layer, said adhesive layer comprising a thermoplastic polyester.

8. A heat-resistant container as defined in claim 7, wherein said adhesive layer comprises a dicarboxylic component and a glycol component including at least one element selected from the group consisting of aluminum, chromium, tin, germanium, and silicon, in an amount of from about 0.1 to about 5 moles per 100 moles of the dicarboxylic component.

9. A heat resistant container comprising an ethylene-vinyl alcohol copolymer layer and a crystalline polyester resin layer, said crystalline polyester resin layer comprising a thermoplastic polyester and a crystallization accelerator consisting essentially of a polyolefin.

10. A heat-resistant container as defined in claim 9, wherein said crystalline polyester layer is provided on both surfaces of said ethylene-vinyl alcohol copolymer layer.

11. A heat-resistant container as defined in claim 9, wherein said container exhibits a shrinkage ratio at the container body (longitudinal direction) when heated in an electric cooking oven at 220° C. for 30 minutes of not more than 10%.

12. A heat-resistant container as defined in claim 9, wherein said polyolefin is a polymer obtained from olefin monomers having from 2 to 6 carbon atoms.

13. A heat-resistant container as defined in claim 12, wherein said polyolefin is low density polyethylene.

* * * * *